United States Patent [19]
Nilsson et al.

[11] Patent Number: 5,013,125
[45] Date of Patent: May 7, 1991

[54] PULLING EYE ASSEMBLY FOR CONNECTORIZED OPTICAL FIBER CABLES

[75] Inventors: Richard C. Nilsson; Jeffrey S. Barker, both of Hickory, N.C.

[73] Assignee: Alcatel NA Cable Systems Inc., Claremont, N.C.

[21] Appl. No.: 416,607

[22] Filed: Oct. 2, 1989

[51] Int. Cl.⁵ .................................. G02B 6/44
[52] U.S. Cl. ..................... 350/96.23; 254/134.3 R
[58] Field of Search .............. 350/96.2, 96.23; 174/79, 70 R; 254/134.3 R

[56] References Cited

U.S. PATENT DOCUMENTS

| | | | |
|---|---|---|---|
| 4,217,028 | 8/1980 | Reh et al. | 350/96.23 |
| 4,337,923 | 7/1982 | Smith | 254/134.3 FT |
| 4,411,409 | 10/1983 | Smith | 254/134.3 FT |
| 4,453,291 | 6/1984 | Fidrych | 24/115 N |
| 4,460,159 | 7/1984 | Charlebois et al. | 350/96.23 |
| 4,514,005 | 4/1985 | Fallon | 294/86.42 |
| 4,601,507 | 7/1986 | Fallon | 294/86.42 |
| 4,737,010 | 4/1988 | Le Maitre et al. | 350/96.23 |
| 4,902,096 | 2/1990 | Calzolari et al. | 350/96.23 |
| 4,928,135 | 5/1990 | Kayoun et al. | 350/96.23 |

Primary Examiner—John D. Lee
Assistant Examiner—John Ngo
Attorney, Agent, or Firm—Peter C. Van Der Sluys

[57] ABSTRACT

A pulling assembly for connectorized optical fiber cables is formed of a flexible metal braided hose portion for conveying a pulling force to said cable and for providing a chamber in which the cable connectors may be housed during a cable pulling operation. A cylindrical housing is attached to one end of said braided metal hose and includes a concentrically-arranged central strength member gripping apparatus and a buffer tube alignment structure disposed about the central strength member gripping apparatus. A crimping sleeve is attached to an opposite end of said cylindrical housing fixing said concentric arrangement within the cylindrical housing and being crimpably engageable with an outer surface of an optical fiber cable.

18 Claims, 2 Drawing Sheets

PULLING EYE ASSEMBLY FOR CONNECTORIZED OPTICAL FIBER CABLES

BACKGROUND OF THE INVENTION

1. Field of the Invention

The present invention relates to devices used to pull connectorized optical fiber cables through cable ducts, and more particularly, to such devices for use with what is known as loose buffer tube optical fiber cable.

2. Description of the Prior Art

The use of optical fibers is becoming prevalent in the telecommunications and data communications industries, and new building structures are being provided with cable ducts for the subsequent installation of optical fiber cables. Additionally, the telephone companies have found that the space in existing duct systems can be more effectively utilized by the use of optical fiber cable because of its small outer diameter, which is typically less than 0.90 inch.

A typical 4-inch duct has installed therein sub-ducts such as, for example, three 1¼-inch sub-ducts, or four 1-inch subducts, through which optical fiber cable is to be installed.

A typical optical fiber cable is represented in FIG. 1, where there is shown a loose buffer tube type cable 2. The cable is formed about a central strength member 4 which may be formed of either a single steel or a dielectric member or a plurality of twisted members. Disposed about the central strength member 4 is usually a plastic jacketing material 6. Buffer tubes 8 carrying optical fibers 10 are wrapped around the central strength member in a helical or reverse helical manner. On occasion, filler tubes, such as a tube 12 are used to take up space when the cable capacity does not require the use of all buffer tubes. A binder tape or thread 14 is helically wrapped around the buffer tubes for maintaining them in the proper orientation, and a first inner polyethylene jacket 16 is extruded about the binder tape. A ripcord 18 is provided to assist in removing the inner jacket 16. A strength and protective member in the form of a corrugated steel armor layer 20 may be provided for additional protection against possible rodent damage. The armor 20 is usually coated with a thin layer of plastic material. A second ripcord 22 is used to assist in removal of the armor 20. A final polyethylene outer jacket 24 is provided for additional cable protection.

The above structure is a typical loose buffer tube cable construction used in many optical fiber installations at the present time.

Due to the extremely small size of the optical fiber and the difficulty of making fiber splices in the field, it has become common to provide connectorized optical fiber cables wherein connectors are provided at the ends of each buffer tube 8 for connecting the fibers within the buffer tube to the fibers of another cable. Connectorized cables are produced by a number of manufacturers including Alcatel Cable Systems and AT&T.

Due to the fragile nature of optical fibers, pulling cables through pre-installed ducts is a difficult and tedious task, which task is exacerbated when the cable is connectorized and a plurality of connectors at the ends of buffer tubes must also be pulled through the ducts. Invariably, the cable connectors would be damaged during installation. Pulling eye assemblies were devised to facilitate the installation of cables through ducts. The pulling eyes provided a means for gripping the cable and, in particular, the strength components of the cable, so that stresses would not be exerted on the optical fibers while the cable was pulled through the duct system. With the advent of the connectorized optical fiber cables, the pulling eyes assumed an additional task of protecting the cable connectors during installation.

Most manufacturers of connectorized cable provide some form of pulling eye. In most pulling eyes, a braided metallic hose was used to attach a nose piece to a cable clamping device, with the pulling tension being exerted on the braided metal hose, as opposed to the cable components. The protected interior of the braided metal hose provided a secure chamber in which the cable connectors could be protected.

Due to the small size of the cable ducts, the cable diameter had to be maintained at a minimum, as did the diameter of the pulling eye assembly. Most existing pulling eyes have too large a diameter and therefore require larger duct sizes. In addition, the pulling eye had to be of such size that it could pass through bends having a predetermined minimum radius. A standard size requirement for pulling eyes is that a cable with an outer diameter of 0.750 inch must pass through a 1-inch sub-duct with a 24-inch bend radius.

Another requirement that must be met during the installation of a non-dielectric connectorized cable through existing ductwork is that electrical continuity must be maintained throughout the length of the optical fiber cable system, so that the cable can be grounded to drain any electrical charge that may build up on the cable, either as a result of static electricity or inadvertent contact with an electrical source. Thus, grounding of the steel armor layer is essential for safety purposes.

SUMMARY OF THE INVENTION

The present invention contemplates a pulling eye assembly to be used for pulling connectorized loose buffer tube cable through ducts. The pulling eye assembly is designed to protect the loose buffer tubes, the optical fibers and the connectors during installation and use. The pulling eye is designed to provide electrical continuity when the cables are installed using metallic components. The design is such that moisture is prevented from entering the optical fiber cable at junction points between cables.

The pulling eye uniquely uses a soft metal crimping sleeve having a serrated inner surface adapted to receive the cable diameter and at least a strip of cable armored material which is folded back, for providing electrical continuity with the crimping sleeve. A collet holder is provided with a conical central opening for receiving the cable strength member and longitudinal channels formed along an outer surface for receiving the buffer tubes. A pair of collets are driven into the conical opening of the collet holder through the use of a hollow set screw to forcibly engage the cable strength, member. A tubular housing is disposed over the collet holder to maintain the buffer tubes in their proper position, and to rigidly engage the crimping sleeve at one end and a braided metal hose at a second end, in which the connectors associated with the buffer tubes are protectively disposed during installation of the optical fiber cable.

The crimping sleeve is crimped onto the outer jacket of the cable and over a strip of steel armor for providing a waterproof connection and electrical continuity. O- rings are provided on the crimping sleeve and on one end of the braided hose assembly to provide a watertight seal with the tubular housing.

A primary objective of the present invention is to provide a pulling eye assembly which may be used to pull connectorized loose buffer tube type optical fiber cables through cable ducts.

Another objective of the present invention is to provide a pulling eye assembly that protects the loose buffer tubes, optical fibers and connectors during installation and use.

Another objective of the present invention is to provide electrical continuity between optical fiber cables being connected together and any additional metal components used in the connection housing.

Another objective of the present invention is to provide a pulling eye assembly which protects the optical fibers and connectors from water ingress.

Another objective of the present invention is to allow the installation of a cable with an outer diameter of up to 0.75 inch into a 1-inch sub-duct with a 24-inch bend radius.

DETAILED DESCRIPTION OF THE INVENTION

Figure 1:
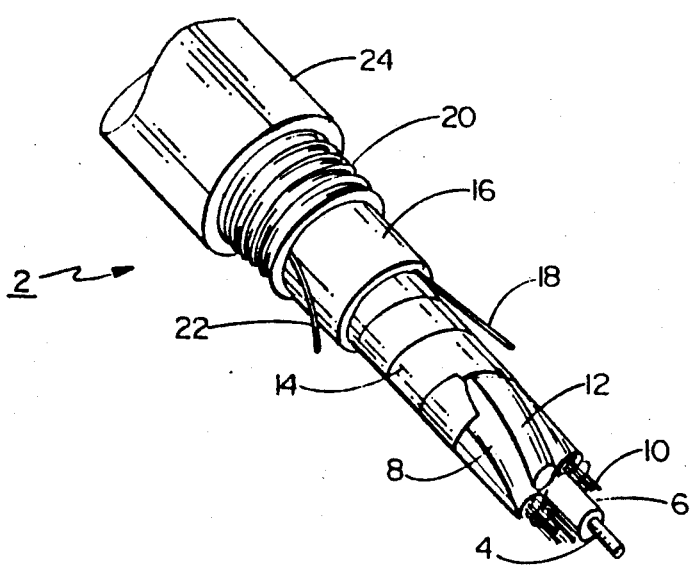
FIG. 1 is a perspective cutaway view showing an optical fiber cable of the prior art.
Figure 2:
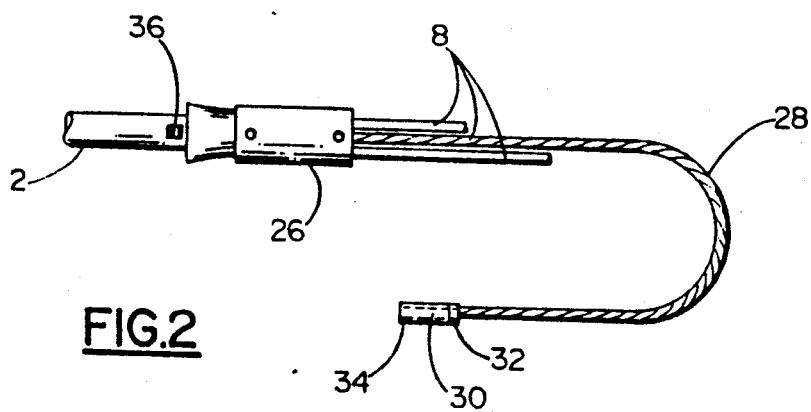
FIG. 2 shows a connectorized optical fiber cable.

Referring to FIG. 2, there is shown a connectorized cable 2 having attached thereto a cable clamping apparatus 26 of a pulling eye assembly of the present invention. The cable clamping apparatus 26 engages the central strength member 4 of cable 2 and also has a portion thereof crimped onto the outer cable jacket 24 of cable 2. Shown extending through the cable clamping apparatus are three buffer tubes 8, one of which is shown connected to a flexible spiral tubing 28, through which the optical fibers extend for connection to a connector 30. Connector 30 is any one of several available standard optical fiber connectors; however, the invention is shown using the LIGHTRAY connector sold by Alcatel Cable Systems, Inc. of Claremont, N.C. A strain relief mechanism 32 is disposed between the connector 30 and the flexible spiral tubing 28, and a removable dust cover 34 is disposed over the connector 30.

Prior to installation of the cable clamping apparatus onto the cable, a portion of the corrugated steel armor 20 is stripped and folded back, as shown at 36 in FIG. 2. This portion of the steel armor is in electrical contact with the cable clamping apparatus 26. It is to be understood that each of the buffer tubes 8 that is used is terminated with a connector 30; however, for the sake of clarity only one tube is shown with a connector. Preferably the buffer tubes are terminated at different lengths so that no two connectors 30 are at the same distance from the cable clamping apparatus 26, thereby facilitating the placement of the connectors within the pulling eye assembly.

Figure 3:
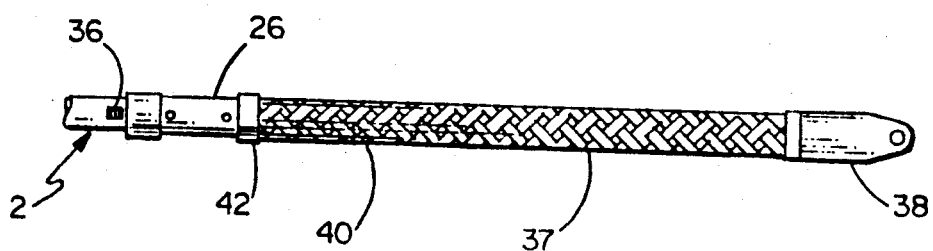
FIG. 3 shows an assembled pulling eye attached to an optical fiber cable.

Referring to FIG. 3, there is shown an assembled pulling eye comprising a cable clamping apparatus 26 and flexible hose assembly 37. Hose assembly 37 includes a nose piece 38, a braided metal hose 40 and a connector collar 42, all structurally connected together and connected as an assembly to the cable clamping apparatus 26. The braided metal hose 40 provides a hollow interior space into which the buffer tubes and connectors may be protectively disposed. The braided hose 40 includes corrugated internal components which provide both flexibility and a hermetic seal for the prevention of the ingress of moisture to the optical fibers and connectors. An outer layer of braided metal is provided to transfer a pulling force exerted on the nose piece 38 to the cable clamping apparatus 26 without exerting tension on the optical fibers contained within the hose 40.

Figure 4:
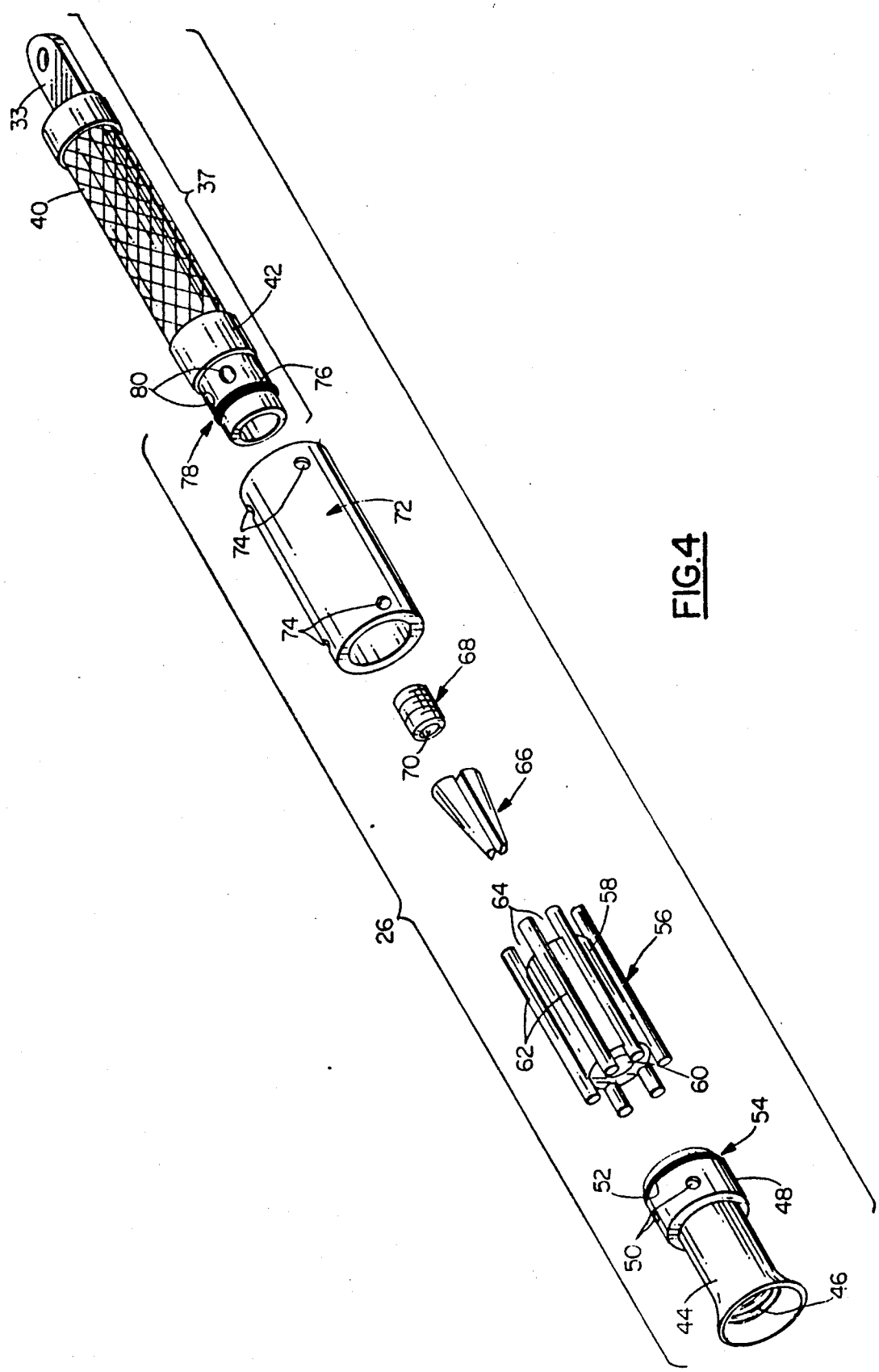
FIG. 4 is an exploded view showing the components of the pulling eye assembly of the present invention.

Referring to FIG. 4, there is shown an exploded view of the pulling eye assembly of the present invention comprising the cable clamping apparatus 26 and the hose assembly 37. The cable clamping apparatus 26 includes a crimping sleeve 44 formed of a non-corrosive, malleable, electrically-conductive metal, such that it may be crimped over the jacket of cable 2. Crimping sleeve 44 has an opening therethrough, defined by an inner surface having a diameter slightly larger than the outer diameter of cable 2. Formed on the inner surface of the crimping sleeve are serrations 46, which could be in the form of threads and function to improve the grip to the outer jacket, and to pierce the thin plastic coating disposed over the corrugated steel armor 20, a strip of which is shown as 36 in FIGS. 2 and 3.

Crimping sleeve 44 includes a collar 48 having four depressions 50 formed in an outer surface thereof and disposed 90 degrees apart. A shoulder 52 is formed on the collar, and a O-ring 54 is positioned against said shoulder. Preferably the crimping sleeve is formed of brass, which provides the desired physical and electrical characteristics for the crimping sleeve.

During installation of the crimping sleeve onto cable 2, the various layers of the cable are stripped back appropriate distances, and a portion of the steel armor 20 is folded back over the cable outer jacket 24. The outer jacket adjacent the stripped end is coated with a silicone gel, and the crimping sleeve 44 is slipped over the cable components, to a position so that it encompasses the coated portion of the outer jacket 24. The crimping sleeve 44 is then crimped onto the cable jacket preferably using an octagon-shaped crimping tool, so that the metal is not excessively deformed and a good seal is formed between the crimping sleeve and the outer jacket 24. During crimping, the serrations 46 pierce the coating of the armor strip 36 to provide electrical contact between the crimping sleeve and the corrugated armor 20 and also penetrate the outer jacket for improved gripping.

The various layers of the cable 2 are stripped and the buffer tubes containing the optical fibers are cut so that each extends a different distance from the end of the jacket 24. The central strength member 4 is cut to protrude only slightly beyond an end of the jacket 24. The jacket 6 over the central strength member 4 is stripped back, and the central strength member is preferably roughened so that the pulling eye assembly makes a secure attachment thereto.

A collet holder 56 is adapted to receive a pair of collets 66 for gripping the central strength member 4 of cable 2. The collet holder 56 is formed of a non-corrosive material, such as stainless steel, and includes a central cylindrical portion 58 having a conical opening 60 extending therethrough. Opening 60 is partially conical and partially cylindrical. The conical portion is at an end adjacent the crimping sleeve and widens in the direction away from sleeve 44. The cylindrical portion is threaded and has a diameter approximately equal to the maximum diameter of the conical portion. Longitudinal channels 64 are symmetrically located around the exterior of the cylindrical portion 58.

The collet holder 56 could be machined from a single piece having a central opening, with an external surface having formed therein channels. In the alternative, the collet holder 56 could be molded from a hard synthetic material, such as plastic, with only the threads being machined. A hollow set screw 68 has an opening 70 formed therethrough, through which the central strength member 4 is disposed.

During assembly, the central strength member 4 extends into the center of the collet holder 56, with one of said collets 66 disposed on each side of the central strength member. The set screw 68 is slipped over the central strength member and is threaded into the threaded portion of the opening 60 to forcibly drive the collets 66 into the conical portion of opening 60 so as to exert a clamping force onto the central strength member 4.

The buffer tubes 8 are disposed in the channels 64 of collet holder 56 so that the buffer tubes are protected and guided through the cable clamping apparatus 26.

A stainless steel cylindrical sleeve 72 has eight threaded openings 74, four disposed at each end thereof, at positions, 90 degrees apart. The sleeve 72 is slipped over the collet holder 56 and is secured to the collar 48 of the crimping sleeve 44 through the use of four set screws, not shown, which are threaded into openings 74 so as to engage the depressions 50 formed in collar 48. O-ring 54 engages both the crimping sleeve 44 and the sleeve 72 to provide a hermetic seal therebetween.

The hose assembly 37 includes, at an inner end thereof, an extension of the collar 42 which includes a shoulder 76 against which an O-ring 78 is disposed. Four depressions 80 are formed in a surface of the collar and are located at positions displaced 90 degrees from each other.

During assembly, the buffer tubes 8 terminated by the connectors 30 are inserted into the hose assembly, which assembly is inserted into the far end of sleeve 72 and is attached thereto by the use of set screws, not shown, inserted into the threaded openings 74 for engaging the depressions 80. The set screws are threaded sufficiently far into the threaded openings 74 so that they do not extend significantly above the surface of the sleeve 72. The O-ring 78 engages the surface of collar 42 and sleeve 72 to provide a hermetic seal therebetween.

After the complete assembly of the pulling eye onto a connectorized optical fiber cable, a flexible wire or rope is guided through the duct so as to extend the full length of the duct, after which, the wire is attached to the nose piece 38, so that the cable may be pulled through the duct. The tension on the pulling eye assembly is exerted through the braided metal hose 40, so that no strain is exerted on the optical fibers. The optical fibers are maintained within the buffer tubes, and the buffer tubes and connectors are protected within the hose assembly 40 to prevent damage during the installation procedure. Electrical continuity is provided from cable to cable to prevent injury from accumulated static electricity or the accidental contact of the cable to an electrical source. The assembly is water tight to prevent the ingress of water, which would deteriorate the optical fibers and the connectors. The components are of sufficiently small size that they may be slid without difficulty through a 1-inch sub-duct, even with a 24-inch bend radius.

After the cable is fully installed within the duct, the hose assembly 37 of the pulling eye is removed, while the cable clamping apparatus 26 remains attached to the cable to protect the fibers and to provide electrical continuity. If the cable is terminated in a junction box or housing, a lead wire can be connected from the housing to the sleeve 72 and attached by means of a screw inserted into one of the threaded holes 74. Alternatively, electrical continuity may be established by securing the pulling eye in the housing with a metallic clamp. The junction box or housing may then be connected to ground to provide a means for discharging any electricity.

Thus, the above-described pulling eye assembly provides a unique structure that satisfies all of the objectives heretofore set forth. The use of the collet holder significantly reduces the pulling eye diameter by allowing the loose buffer tubes to fit into the closely-spaced channels, thereby maintaining minimum diameter. The serrated interior surface of the crimping sleeve provides for both electrical continuity and a good hermetic seal.

What is claimed is:

1. A pulling eye assembly for an optical fiber cable of the type having a central strength member and a plurality of structurally discrete loose buffer tubes helically wrapped about said central strength member, said assembly comprising:
   means for gripping said central strength member; and
   means associated with said gripping means for receiving and aligning said loose buffer tubes.

2. An assembly as described in claim 1, wherein said optical fiber cable includes a conductive armor layer and said assembly further includes means for making electrical contact to the conductive armor layer.

3. A pulling eye assembly for an optical fiber cable of the type having a central strength member and a plurality of loose buffer tubes disposed about said central strength member, said assembly comprising:
   means for gripping said central strength member; and
   means associated with said gripping means for receiving and aligning said loose buffer tubes, said means comprising a cylindrical member having an outer surface with parallel, longitudinally-extending channels formed therein, for receiving said loose buffer tubes.

4. An assembly as described in claim 3, wherein the means for receiving and aligning is disposed about the gripping means.

5. An assembly as described in claim 4, wherein said member comprises a cylindrical body having an opening therethrough for receiving said central strength member, said gripping means being disposed within said opening.

6. A pulling eye assembly for an optical fiber cable of the type having a central strength member, a plurality of loose buffer tubes disposed about said central strength member, and an outer jacket, said assembly comprising:
   cable gripping apparatus including a crimping sleeve adapted to receive the cable and to be crimped onto the outer jacket;
   central strength member gripping means in contact with said cable gripping means and including a cylindrical member having a conical opening therein adapted to receive the central strength member of the cable, collets adapted to be wedged between the central strength member and the surface of the conical opening, means for forcibly driving said collets into engagement with the central strength member and the surface of the conical opening, means for forming channels in an outer surface of said cylindrical member in which the loose buffer tubes of the cable may be placed, and a cylindrical sleeve encompassing the central strength member gripping means and the channel forming means and attached to said crimping sleeve; and a hose assembly including a flexible hose portion encompassed by a braided metal hose, said flexible hose portion defining an interior chamber into which said buffer tubes may extend, attachment means secured to one end of said braided metal hose, and means secured to the other end of said braided hose for attaching to said cylindrical sleeve, whereby tension exerted on said attaching means is conveyed through said braided hose to said cylindrical sleeve to said crimping sleeve to said central strength member gripping means and to said central strength member for pulling an optical fiber cable through a duct.

7. A pulling eye assembly as described in claim 6, where said crimping sleeve engages said outer cable jacket in a water-tight manner and said hose assembly is constructed to be water tight, said assembly additionally comprises:

means disposed between said crimping sleeve and said cylindrical sleeve to prevent ingress of water; and means disposed between said cylindrical sleeve and said hose assembly to prevent ingress of water.

8. A pulling eye assembly as described in claim 6, wherein the cable has an armored layer, a portion of which is stripped and folded backwards along the outer jacket and said crimping sleeve additionally includes means for making electrical contact with said armored layer.

9. A pulling eye assembly as described in claim 8, wherein the means for making electrical contact comprises serrations on an inner surface of said crimping sleeve.

10. A pulling eye assembly for an optical fiber cable of the type having a central strength member and a plurality of loose buffer tubes disposed about said central strength member, said assembly comprising:

means for gripping said central strength member; and a cylindrical body having an opening therethrough for receiving the central strength member and further having an outer surface with channels formed therein for receiving said loose buffer tubes, said gripping means being disposed within the opening of the cylindrical body and comprising a pair of collets, said opening being defined at least partially by a conical surface, whereby said collets may be wedged into said opening while engaging said conical surface and said central strength member.

11. An assembly as described in claim 10, additionally comprising means for driving said collets into said opening.

12. A pulling eye assembly for an optical fiber cable of the type having a central strength member and a plurality of loose buffer tubes disposed about said central strength member, said assembly comprising:

means for gripping said central strength member;

means associated with said gripping means for receiving and aligning said loose buffer tubes; and a crimping sleeve adapted to extend over an outer jacket of said cable and to be crimped thereon, said crimping sleeve being an axial alignment and in contact with said means for receiving and aligning the loose buffer tubes.

13. An assembly as described in claim 12, wherein the optical fiber cable includes a conductive armor layer, a portion of which is folded back over an outer surface of the cable at a cable end, said assembly additionally comprising serrations formed on the inside of said crimping sleeve for conductively engaging the folded portion of said conductive armor layer.

14. A pulling eye assembly for an optical fiber cable of the type having a central strength member and a plurality of loose buffer tubes disposed about said central strength member and having connectors secured to the ends of said loose buffer tubes, said assembly comprising:

means for gripping said central strength member;

means associated with said gripping means for receiving and aligning said loose buffer tubes; and means for protectively encompassing said connectors, said means for protectively encompassing being in axial alignment and connected to the said gripping means.

15. An assembly as described in claim 14, wherein said encompassing means comprises a flexible hose.

16. An assembly as described in claim 15, wherein said braided hose includes on an exterior surface thereof a braided metal portion through which axial tension may be exerted.

17. An assembly as described in claim 10, wherein said braided metal hose is terminated at one end with a means for attaching thereto a force-exerting member and at the other end with a means for attaching to said receiving and aligning means.

18. A pulling eye assembly for an optical fiber cable of the type having a central strength member and plurality of loose buffer tubes disposed about said central strength member, said assembly comprising:

means for gripping said central strength member; and means disposed about the gripping means for receiving and aligning said loose buffer tubes, said loose buffer tubes extending beyond and about said gripping means and being aligned by said means for receiving and aligning.

* * * * *